(12) United States Patent
Mathys

(10) Patent No.: US 7,441,791 B1
(45) Date of Patent: Oct. 28, 2008

(54) WHEELBARROW TOWING SYSTEM

(76) Inventor: Russel E. Mathys, 10455 Steiner Rd., Rittman, OH (US) 44270

(*) Notice: Subject to any disclaimer, the term of this patent is extended or adjusted under 35 U.S.C. 154(b) by 0 days.

(21) Appl. No.: 11/704,926

(22) Filed: Feb. 12, 2007

(51) Int. Cl.
*B62C 1/06* (2006.01)

(52) U.S. Cl. .................... 280/186; 280/47.31; 280/402; 410/4

(58) Field of Classification Search ................ 280/402, 280/656, 659, 30, 47.31, 47.341, 47.18, 47.2, 280/47.24, 47.26, 47.32, 46, 79.11, 79.4, 280/79.7; 410/4; 414/482, 483, 484, 485
See application file for complete search history.

(56) References Cited

U.S. PATENT DOCUMENTS

| | | | | |
|---|---|---|---|---|
| 4,052,079 | A * | 10/1977 | Lehman | ..................... 280/47.2 |
| 4,155,678 | A | 5/1979 | Lehman et al. | |
| 4,281,950 | A * | 8/1981 | Lehman et al. | ................. 410/3 |
| 4,740,008 | A | 4/1988 | Johnson | |
| D296,373 | S | 6/1988 | Madison, Jr. | |
| 4,895,319 | A * | 1/1990 | Bardsen et al. | ............. 244/115 |
| 5,087,061 | A * | 2/1992 | Wallace | ........................ 280/30 |
| 5,340,134 | A * | 8/1994 | Dodson | ........................ 280/37 |
| 5,458,356 | A | 10/1995 | Fedorko et al. | |
| 5,509,681 | A | 4/1996 | Keller | |
| 5,609,461 | A * | 3/1997 | Lichtenberg | ................. 414/426 |
| 5,915,706 | A * | 6/1999 | Mosley | ..................... 280/47.26 |
| 7,140,630 | B2 * | 11/2006 | Abel | ........................... 280/292 |
| 7,278,647 | B1 * | 10/2007 | Keenan et al. | ........... 280/79.11 |

* cited by examiner

*Primary Examiner*—Christopher Ellis
*Assistant Examiner*—John D Walters

(57) ABSTRACT

A wheelbarrow towing system includes a wheelbarrow that includes a housing with a bottom wall and a peripheral wall that is attached to and extends upwardly from the bottom wall. An axle is attached to the bottom wall adjacent to a front end of the housing. At least one wheel is rotatably to the axle. A pair of supports is attached to and extends downward from the bottom wall. The supports are positioned adjacent to a back end of the housing and is spaced from each other. A pair of handles is attached to the housing and extends rearward from the back end. An elongated member has a first end and a second end. The first end is configured to be attached to a tow hitch. The axle is releasably attached to the elongated member adjacent to the second end.

5 Claims, 4 Drawing Sheets

WHEELBARROW TOWING SYSTEM

BACKGROUND OF THE INVENTION

1. Field of the Invention

The present invention relates to wheelbarrow towing devices and more particularly pertains to a new wheelbarrow towing device for allowing a person to tow a wheelbarrow with an all terrain vehicle without permanently affixing a tow latch to the wheelbarrow.

2. Description of the Prior Art

The use of wheelbarrow towing devices is known in the prior art. While these devices fulfill their respective, particular objectives and requirements, the need remains for a system that can be mounted to a wheelbarrow in such a manner that the wheelbarrow is coupled to an all terrain vehicle (ATV) without permanently affixing the system to the wheelbarrow and which provide stable support for the wheelbarrow when it is being towed.

SUMMARY OF THE INVENTION

The present invention meets the needs presented above by generally comprising a wheelbarrow that includes a housing having a bottom wall and a peripheral wall that is attached to and extends upwardly from the bottom wall. An axle is attached to the bottom wall adjacent to a front end of the housing. At least one wheel is rotatably to the axle. A pair of supports is attached to and extends downward from the bottom wall. The supports are positioned adjacent to a back end of the housing and is spaced from each other. A pair of handles is attached to the housing and extends rearward from the back end. An elongated member has a first end and a second end. The first end is configured to be attached to a tow hitch. The axle is releasably attached to the elongated member adjacent to the second end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
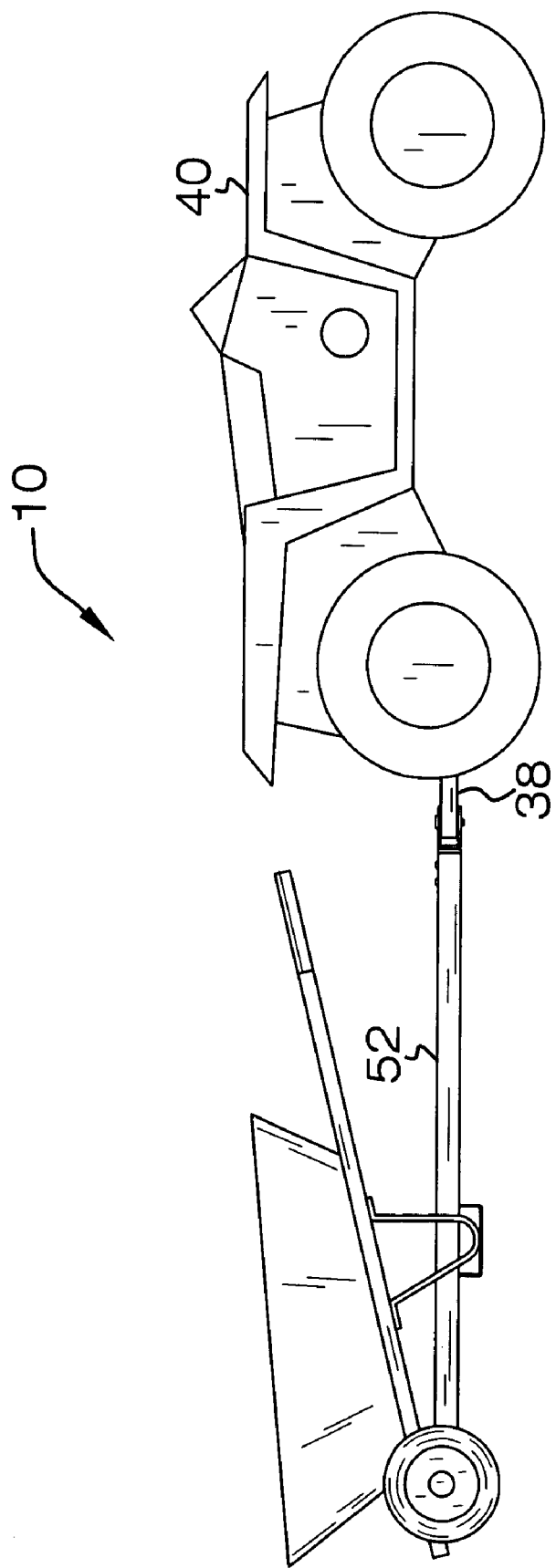
FIG. 1 is a side in-use view of a wheelbarrow towing system according to the present invention.
Figure 2:
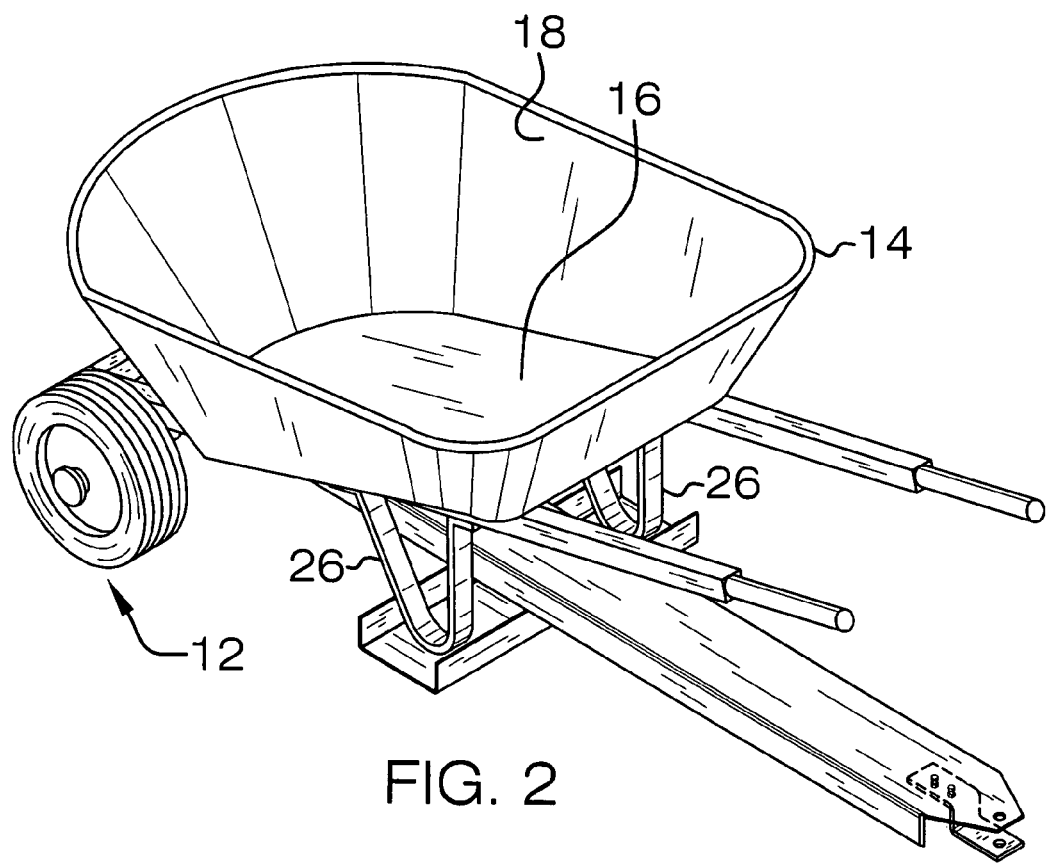
FIG. 2 is a rear perspective view of the present invention.

With reference now to the drawings, and in particular to FIGS. 1 through 5 thereof, a new wheelbarrow towing device embodying the principles and concepts of the present invention and generally designated by the reference numeral 10 will be described.

Figure 3:
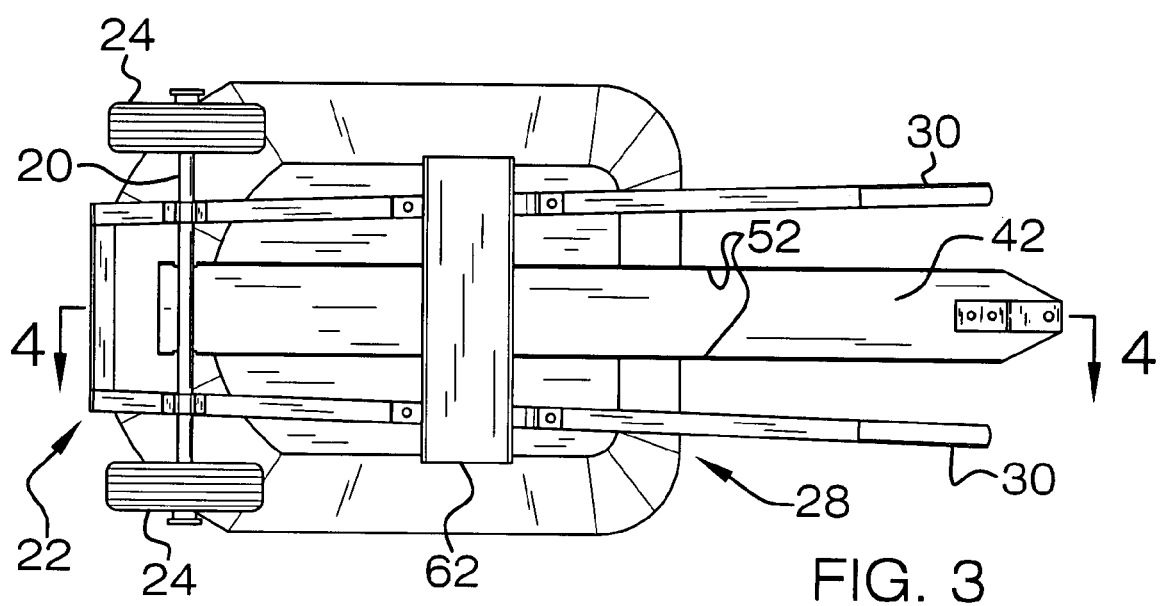
FIG. 3 is a bottom view of the present invention.

As best illustrated in FIGS. 1 through 5, the wheelbarrow towing system 10 generally comprises a wheelbarrow 12 that includes housing 14 having a bottom wall 16 and a peripheral wall 18 that is attached to and extends upwardly from the bottom wall 16. An axle 20 is attached to the bottom wall 16 adjacent to a front end 22 of the housing 14. At least one wheel 24 is rotatably to the axle 20. FIG. 3 depicts a wheelbarrow 12 having a pair of wheels 24. A pair of supports 26 is attached to and extends downward from the bottom wall 16. The supports 26 are positioned adjacent to a back end 28 of the housing 14 and are spaced from each other. A pair of handles 30 is attached to the housing 14 and extends rearward from the back end 28. The supports 26 may be attached to the bottom wall 16 in such a manner that the handles 30 are positioned between the supports 26 and the bottom wall 16.

An elongated member 32 has a first end 34 and a second end 36. The first end 34 is configured to be attached to a tow hitch 38 of an ATV 40. The axle 20 is releasably attached to the elongated member 32 adjacent to the second end 36. The elongated member 32 includes an elongated panel 42 that has a first side edge 44 and a second side edge 46. The elongated panel 42 adjacent to the first end 34 has an aperture 48 extending therethrough. A latch pin 50 is extendable through the aperture 48 and the tow hitch 38. A pair of side walls 52 is provided. Each of the side walls 52 is attached to and extends along one of the first 44 and second 46 side edges. Each of the side walls 52 has a bottom edge 54 having a notch 56 therein. The axle 20 is positioned in and rests in the notches 56 in the side walls 52. A stabilizer 58 is attached to a bottom surface of the elongated panel 42 and has an opening 60 therein aligned with the aperture 48. The tow hitch 38 is positioned between the stabilizer 58 and the panel 42. The latch pin 50 extends through the aperture 48, the tow hitch 38 and the opening 60.

A lift 62 is attached to the elongated member 32 and receives the supports 26. The lift 62 includes a base wall 64 and a pair of lateral walls 66 that are attached to and extend upwardly from the base wall 64. The supports 26 are positioned between the lateral walls 66. The lateral walls 66 each have an upper edge 68 abutting the elongated member 32. The lift 62 has a longitudinal axis orientated approximately perpendicular to a longitudinal axis of the elongated member 32.

Figure 4:
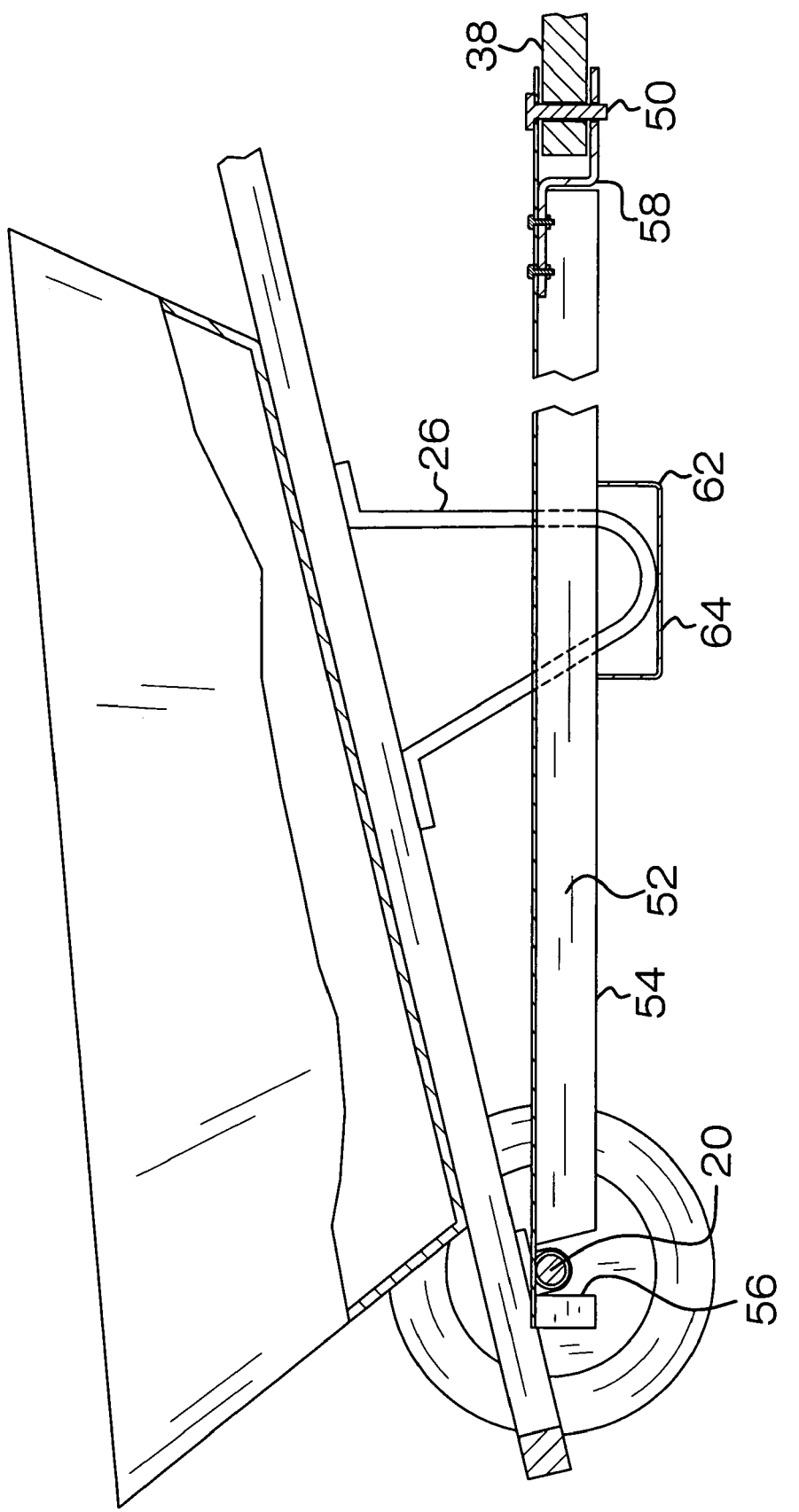
FIG. 4 is a cross-sectional view taken along line 4-4 of FIG. 3 of the present invention.
Figure 5:
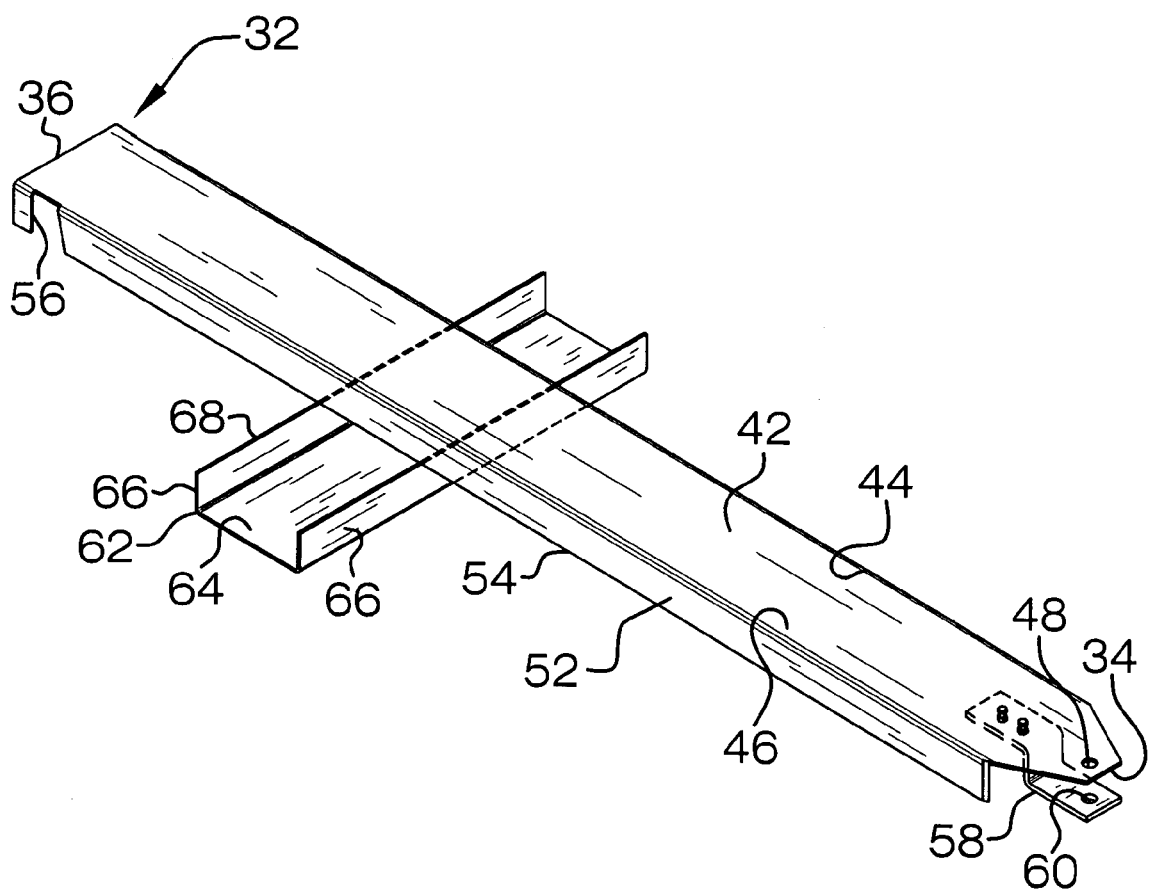
FIG. 5 is a top perspective view of the present invention.

In use, the axle 20 is placed in the notches 56 as shown in FIG. 4 and the supports 26 positioned on the lift 62. When the elongated member 32 is attached to the tow hitch 38, the supports 56 are picked up off of the ground surface and the wheelbarrow 12 is supported by the wheel(s) 24 and the elongated member. The allows the ATV 40 to pull the wheelbarrow 12 without permanently affixing the elongated member 32 to the wheelbarrow 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelbarrow towing system comprising:

a wheelbarrow including housing having a bottom wall and a peripheral wall being attached to and extending upwardly from said bottom wall, an axle being attached to said bottom wall adjacent to a front end of said housing, at least one wheel being rotatably to said axle, a pair of supports being attached to and extending downward from said bottom wall, said supports being positioned adjacent to a back end of said housing and being spaced from each other, a pair of handles being attached to said housing and extending rearward from said back end;

an elongated member having a first end and a second end, said first end being configured to be attached to a tow hitch, said axle being releasably attached to said elongated member adjacent to said second end; and a lift being attached to said elongated member, said lift receiving said supports, said lift including a base wall and a pair of lateral walls being attached to and extending upwardly from said base wall, said supports being positioned between said lateral walls, said lateral walls each having an upper edge abutting said elongated member, said lift having a longitudinal axis orientated approximately perpendicular to a longitudinal axis of said elongated member, each of said lateral walls having a pair of end edges, each of said lateral walls having a longitudinal axis extending between a pair of associated ones of said end edges, the longitudinal axis of each lateral wall being oriented perpendicular to the longitudinal axis of said elongated member, each of said lateral walls extending laterally away in opposite directions from said elongated member.

2. The system according to claim 1, wherein said elongated member includes:

an elongated panel having a first side edge and a second side edge, said elongated panel adjacent to said first end having an aperture extending therethrough; and a latch pin being extendable through said aperture and the tow hitch.

3. The system according to claim 2, wherein said elongated member further includes a pair of side walls, each of said side walls being attached to and extending along one of said first and second side edges, each of said side walls having a bottom edge having a notch therein, said axle being positioned in said notches in said side walls.

4. The system according to claim 2, wherein said elongated member further includes a stabilizer being attached to a bottom surface of said elongated panel, said stabilizer having an opening therein aligned with said aperture, the tow hitch being positioned between said stabilizer and said panel, said latch pin extending through said aperture, the tow hitch and said opening.

5. A wheelbarrow towing system comprising:

a wheelbarrow including housing having a bottom wall and a peripheral wall being attached to and extending upwardly from said bottom wall, an axle being attached to said bottom wall adjacent to a front end of said housing, at least one wheel being rotatably to said axle, a pair of supports being attached to and extending downward from said bottom wall, said supports being positioned adjacent to a back end of said housing and being spaced from each other, a pair of handles being attached to said housing and extending rearward from said back end;

an elongated member having a first end and a second end, said first end being configured to be attached to a tow hitch, said axle being releasably attached to said elongated member adjacent to said second end, said elongated member including;

an elongated panel having a first side edge and a second side edge, said elongated panel adjacent to said first end having an aperture extending therethrough;

a latch pin being extendable through said aperture and the tow hitch;

a pair of side walls, each of said side walls being attached to and extending along one of said first and second side edges, each of said side walls having a bottom edge having a notch therein, said axle being positioned in said notches in said side walls;

a stabilizer being attached to a bottom surface of said elongated panel, said stabilizer having an opening therein aligned with said aperture, the tow hitch being positioned between said stabilizer and said panel, said latch pin extending through said aperture, the tow hitch and said opening; and a lift being attached to said elongated member, said lift receiving said supports, said lift including a base wall and a pair of lateral walls being attached to and extending upwardly from said base wall, said supports being positioned between said lateral walls, said lateral walls each having an upper edge abutting said elongated member, said lift having a longitudinal axis orientated approximately perpendicular to a longitudinal axis of said elongated member, each of said lateral walls having a longitudinal axis extending between a pair of associated ones of said end edges, the longitudinal axis of each lateral wall being oriented perpendicular to the longitudinal axis of said elongated member, each of said lateral walls extending laterally away in opposite directions from said elongated member.

* * * * *